United States Patent [19]

Feintuch et al.

[11] Patent Number: 5,040,133

[45] Date of Patent: Aug. 13, 1991

[54] ADAPTIVE CLUSTERER

[75] Inventors: Paul L. Feintuch, Covina, Calif.; Michael D. Banach, Ann Arbor, Mich.

[73] Assignee: Hughes Aircraft Company, Los Angeles, Calif.

[21] Appl. No.: 463,756

[22] Filed: Jan. 12, 1990

[51] Int. Cl.$^5$ ............ G06G 7/12; G06F 15/20; G06F 15/00; G06K 9/52
[52] U.S. Cl. .................... 364/581; 364/554; 364/518; 382/28; 382/52
[58] Field of Search ............ 364/581, 514, 516, 554, 364/518; 382/23, 28, 52, 48

[56] References Cited

U.S. PATENT DOCUMENTS

| | | | |
|---|---|---|---|
| 3,659,085 | 4/1972 | Potter et al. | 364/581 X |
| 4,661,913 | 4/1987 | Wu et al. | 364/554 X |

FOREIGN PATENT DOCUMENTS

| | | | |
|---|---|---|---|
| 53-74842 | 7/1978 | Japan | 382/23 |
| 57-137971 | 8/1982 | Japan | 382/28 |
| 61-128384 | 6/1986 | Japan | 382/28 |

Primary Examiner—Parshotam S. Lall
Assistant Examiner—E. J. Pipala
Attorney, Agent, or Firm—Wanda K. Denson-Low

[57] ABSTRACT

This invention relates to a technique and system (34) for clustering a set of data points (18) in a data field. Clustering is performed by a set of rules which make no assumptions about the data fields. That is, the number of clusters, the distance between clusters, etc., need not be specified in advance. The invention calculates a distance R that is a function of the distances between each pair of points (18) in a data field. Operating on a chosen point, a parameter is calculated for each neighboring point within distance R from the chosen point. This parameter is proportional to the distance of the neighboring point to the chosen point. The chosen point P is then connected to a neighboring point on the basis of this parameter. All points, in any order are operating on as the new chosen point, so that the additional points may be linked to new chosen points in a similar manner. In this way, a tree-structure (22, 24) of connected points will form the desired clustering. Points (18) not having other points within distance R will not be clustered or linked.

15 Claims, 2 Drawing Sheets

ADAPTIVE CLUSTERER

BACKGROUND OF THE INVENTION

1. Technical Field

This invention relates to systems and methods for clustering data and, more particularly, to a system for clustering data which adapts to particular characteristics in the data to be clustered.

2. Discussion

One of the most fundamental tasks of sensory processing is to cluster data into manageable and meaningful groupings. It is clear that humans perceive groupings, or "gestalts", in sensory input with a facility that far exceeds the capabilities of today's pattern recognition systems. For this reason, the ability to emulate the human perception of "gestalts" automatically would be highly desirable. For example, in the field of image processing where fields of picture elements (pixels) are automatically scanned and enhanced, it is desirable to collect groups of pixels into individual objects to recognize certain features or textures within the field. Another application for clustering is in object tracking from sonar or radar range and doppler data. In this setting, multiple range/doppler cells are obtained for each object and it is desirable to collect these multiple returns into groups corresponding to individual objects, rather than establishing a track for each cell. An additional application for clustering includes the field of taxonomy in biology, where measurements on a set of organisms are grouped in a way which reflects similarity based on the measurements.

In general, clustering can be applied to any one, or greater, dimensional collection of points where it is desired to break up the data field into meaningful and manageable segments. The clustered data may be useful by itself, or it may be used to simplify further signal processing and decision making. A common problem with previous approaches to clustering is that they are highly parametric; that is, certain key parameters must be provided in advance. These parameters may include, for example, the number of objects, the size of the object, and the separation between the objects. This is a problem because parametric clusterers usually require more information about the data field than is usually practically available. These parameters are almost never known in advance, since they are data dependent.

In previous clustering systems, these clustering parameters are usually obtained by "training" the algorithms on data sets similar to the expected situation. This, in general, produces very sensitive algorithms that work well on the laboratory generated training data, but perform poorly in environments other than the exact ones for which they were designed. There are several existing clustering algorithms, all of which require substantial prior information about the groupings. Some of these clustering approaches are described in the following references:

1) Duda, R. and Hart, P., *Pattern Classification and Scene Analysis*, John Wiley & Sons, N.Y. 1973.

2) Hartigan, J., *Clustering Algorithms*, John Wiley & Sons, N.Y., 1975.

3) Koontz, W., Narendra, P., and Fukunaga, K., "A Graph Theoretic Approach to Nonparametric Cluster Analysis", *IEEE Transactions on Computers*, Vol. C-25, No. 9, pp. 936–944, September 1976.

4) Gitman, I., and Levine, M., "An Algorithm for Detecting Unimodal Fuzzy Sets and Its Application as a Clustering Technique", *IEEE Transactions on Computers*, Vol. C-19, No. 7, pp. 583–593, July, 1970.

5) Zahn, C., "Graph-Theoretic Methods for Detecting and Describing Gestalt Clusters", *IEEE Transactions on Computers*, Vol. C-20, No. 1, pp. 68–86, January 1971.

6) Friedman, H., and Rubin, J., "On Some Invariant Criteria for Grouping Data", *American Statistical Association Journal*, pp. 1159–1178, December, 1967.

The algorithms treated in these references, generally require specifying in advance the number of clusters and cluster distances. In general, however, in most situations this information is not known. The real-world problem of mismatching the assumed number of clusters to the actual case is not resolved by prior approaches. For example, many clustering techniques deal with essentially how to partition N objects into M groups. One of the basic approaches in the texts is to form a least squares fit of the data points to the pre-specified number of groupings. (See reference Nos. 1 and 2, above). Other approaches include mode-seeking, valley-seeking, and unimodal set algorithms. The graph theoretic approach is treated in reference No. 3. It connects the data points in a tree structure based on certain parameters that must be specified in advance.

To avoid specifying parameters in advance, some clustering approaches have been developed with the ability to adapt to a "training" set of data. However, the real world data will never have the same statistical distribution of points as in the training set. Consequently, even approaches that are tuned to a training set fail in real world situations.

Thus it would be desirable to provide a clusterer that does not rely on predefined parameters. In particular, it would be desirable to provide a clusterer in which no parameters are specified in advance, but are, instead extracted from the actual observed data. Further, it would be desirable to provide a clusterer which can adapt to the real world data field, rather than to an artificial training set.

SUMMARY OF THE INVENTION

Pursuant to the present invention, a method and system is provided for clustering a set of data points in a data field. First, a distance value R is calculated for the data points, where R is some function of the distances between each pair of points in the data field. Operating on a chosen point, a parameter is calculated for each neighboring point within distance R from the chosen point. This parameter is proportional to the distance of the neighboring point to the chosen point. The chosen point is then connected to one neighboring point on the basis of this parameter. By then selecting other points as the chosen point, an additional point may be linked to the new chosen point in a similar manner. In this way, a tree structure of connected points will form the desired clustering. Points not having other points within distance R will not be clustered or linked.

BRIEF DESCRIPTION OF THE DRAWINGS

The various advantages of the present invention will become apparent to the one skilled in the art, by reading the following specification and by reference to the drawings in which:

FIG. 5 is a block diagram of a computer system for clustering data in accordance with another embodiment of the present invention.

DESCRIPTION OF THE PREFERRED EMBODIMENT

The basic clustering approach, in accordance with the present invention, is to establish a set of rules that do not change regardless of the data field. This will require parameters that will be determined solely from the observed data. In this way, the algorithm is adapted to the particular situation. The general approach of the present invention is to use the graph-theoretic, or tree-structure approach, which only allows a single connection to be made initiating from one point to any to her point in the grid. The graph-theoretic or tree-structure is described in more detail in reference Nos. 3 and 5, discussed above.

In the graph-theoretic approach, at each point in the grid, a decision is made as to whether or not to link with another point. If a decision to link is made, the clusterer decides to which point the linkage should be made. A single point, P, can be linked to more than one other point, but the other linkages will have to be drawn from the other points to point P, since only one link can leave from point P.

Figure 1:
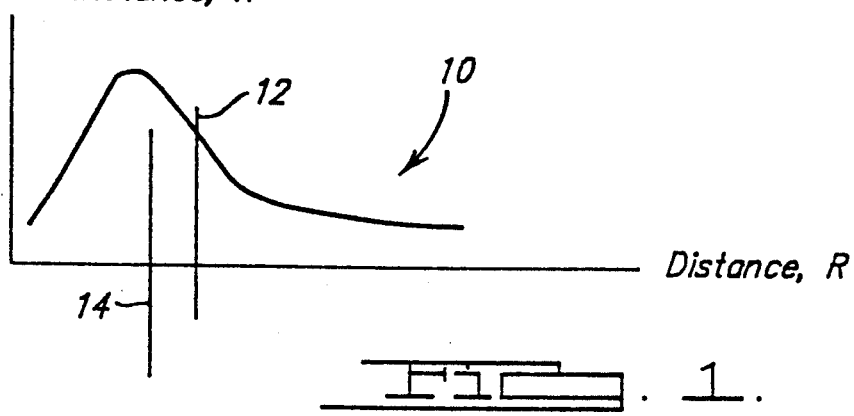
FIG. 1 is a graph showing the number of pairs having given distances, illustrating the method of calculating the distance R in accordance with the preferred embodiment.

In accordance with the preferred embodiment, the present invention employes six additional rules or steps for performing clustering. These rules are as follows:

1. A circle of radius R is drawn around each point in the data field. R may be determined from a histogram of all of the pairwise distances between all the points in the field. This histogram is shown in FIG. 1 at 10. In particular, in histogram 10, the number of pairs having a given distance R in the data field is plotted as function of the distance measured. The mean is identified at 12, and, in accordance with the preferred embodiment, the radius R is selected at distance 14 to be 0.6 times the sample mean. The value of 0.6 is somewhat arbitrary. It is based upon the distribution of the distance values, which will probably be Rayleigh distributed, for which 0.6 times the mean, is the mean minus one standard deviation. It will be appreciated that depending on the nature of the data to be clustered, it may be preferable to choose R in another manner. It is important however, in accordance with the present invention, that R be chosen to be a function of the pairwise distances in the actual data to be clustered.

2. Points beyond the distance R cannot be linked directly. Thus, the only candidates for linking from a single point are those points that fall within a circle of radius R drawn around the point P being considered.

3. For each point in the data field the density of other points around it within the radius R is computed. In accordance with the preferred embodiment, the density is calculated by averaging the number of points within the circle of radius R with a weighting function that decreases monotonically with distance. It is preferred that this weighting function be triangular; that is, zero at the ends of the circle and linear to unity at the center. It is also preferred that the density is limited to a value not to exceed 0.5 times the total number of grid points that are in the circle, as will be explained in more detail, below. It will be appreciated that other methods of calculating the density, and other functions besides density may also be used.

Figure 2:
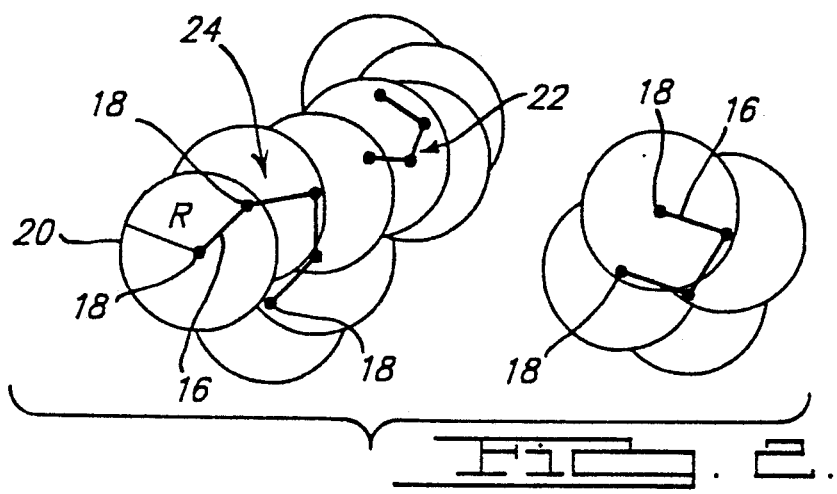
FIG. 2 is an illustration showing representative data points having radii R drawn around them.

4. If there are no points within the circle of radius R, then no linkages are drawn from the point P being considered. Referring now to FIG. 2, it can be seen that linkages 16, between individual data points 18, are drawn between certain of points 18 which lie within circle 20 having the radius R. Likewise, it can be seen that no linkages 16 are drawn between two points exceeding distance R.

5. For the point P being considered, a single point from among all of the points within radius R will be selected for linking to the point P. For each point in the circle 20, the ratio of the point density, as computed in step 3, to the distance from each point to the point P will be computed. Of the candidates points, the point P will be connected to the point within the circle of radius R that has the largest ratio of density-to-distance. All points in the data field are then considered for linking in this way. It will be appreciated that clustering may proceed in any order, and that linking is accomplished independently of previous linkages. Limiting the density to 0.5 times the total number of grid points that are in the circle, as discussed in step 3, prevents the density of points from overwhelming the distance between them in the ratio of density to distance, while still preferring a pairing with another grouping over an isolated point the same distance away. Of course, this step of limiting the density to 0.5 times the total number of grid points is not always necessary and will depend on the particular application and nature of the data to be clustered. If there is a tie, that is, two candidate points having the same ratio, it may be resolved by a uniform random selection, in the manner of a coin toss.

6. Points connected by lines are then grouped together to form clusters for further processing or analysis.

Referring again to FIG. 2, it is noted that one grouping 22, and another grouping 24, lie within distance R from each other but remain separate. This is an important feature of the present invention: two closely spaced density groupings can be formed without linking to one another. In this way, the fine structure of the field can be determined, regardless of the number of objects to be clustered, or of the relative size or spacing.

Figure 3:
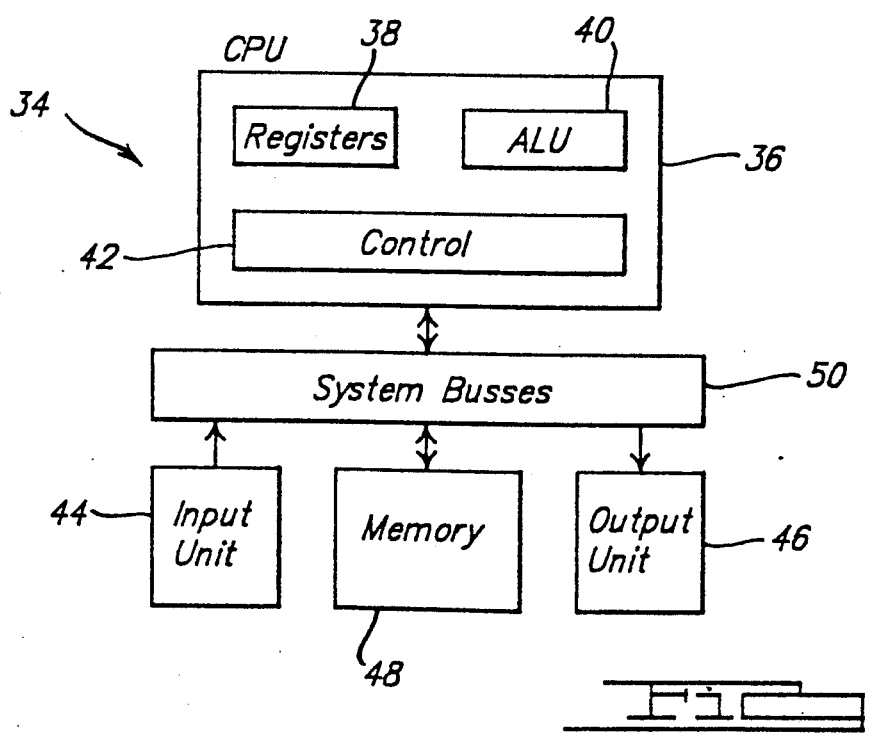
FIG. 3 is a one dimensional data field to be clustered in accordance with the present invention.
Figure 3:
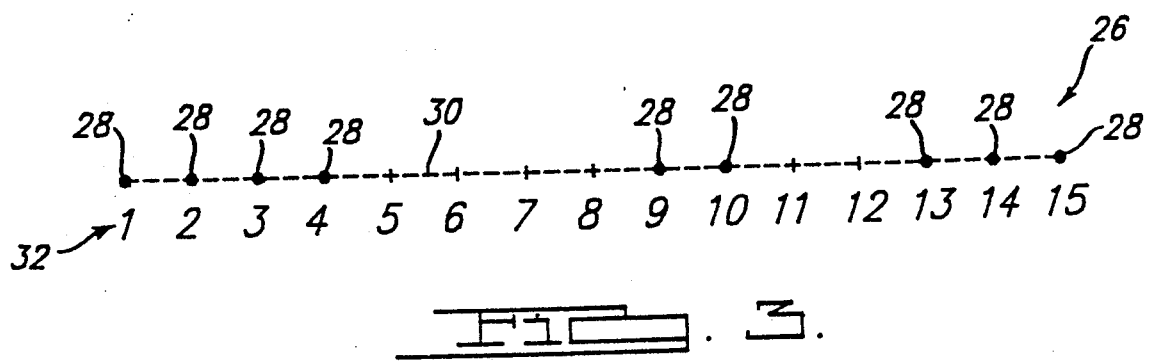

A very simple example of a clustering problem is shown in FIG. 3. A one dimensional data field 26, has individual points 28, lying along a line 30. An integer value 32, is designated for each possible location. In FIG. 3, the points 28 are at locations 1, 2, 3, 4, 9, 10, 13, 14, and 15. The 6 steps in the technique of the preferred embodiment will now be followed:

Step 1: It can be calculated that there are 72 possible pairs of distances between the nine points 28. These 72 distances sum to 472. This yields an average distance between pairs of points of 6.55. The radius, R, drawn around each point will, in this case, correspond to an interval along the line equal to $\pm(0.6)(6.55) = 3.9$.

Step 2: Thus, only points 28 within $\pm 3.9$ of one another are candidates for linking. In this case, that means that points at location Nos. 1, 2, 3, and 4 can be linked together but cannot be linked to any of the other points, since they are greater than 3.9, away. Also, points at 9, 10, 13, 14, and 15 can be potentially linked together, even though they are two separate groups.

Step 3: The density of points surrounding each point 28, within the interval ±3.9, is then computed. The number of grid points within this interval is 6, which is, therefore, the normalization for the density calculations. The triangular weighting function is used. For the radius of 3.9 in this case, it treats points a distance four apart with a weighting of zero, points a distance three apart are weighted with one quarter, points two apart are weighted with one half, and points a distance one apart are weighted with three quarters. The densities around the points are:

| Point | Density (not normalized by 6) |
|-------|-------------------------------|
| 1     | 3/4 + 2/4 + 1/4 = 6/4         |
| 2     | 3/4 + 3/4 + 2/4 = 8/4         |
| 3     | 2/4 + 3/4 + 3/4 = 8/4         |
| 4     | 1/4 + 2/4 + 3/4 = 6/4         |
| 9     | 3/4                           |
| 10    | 3/4 + 1/4 = 4/4               |
| 13    | 1/4 + 3/4 + 2/4 = 6/4         |
| 14    | 3/4 + 3/4 = 6/4               |
| 15    | 2/4 + 3/4 = 5/4               |

Step 4: All of the data points have a point within ±3.9, therefore each point can be linked to some other point as in Step 2.

Step 5: For each point 28, the ratio of the density around the candidate point to the distance to each candidate point for all possible connections is computed, and the largest value is selected as the pairing. For this example, these values are in the following table, where the largest ratio has been underlined to indicate the linkage decision. For simplification all the density values have been multiplied by 4, which will not change the results.

| Point # | Ratios of density-to-distance | Linkage |
|---------|-------------------------------|---------|
| 1  | (1,2) = 8/1 (1,3) = 8/2 (1,4) = 6/3 | 1 to 2 |
| 2  | (2,1) = 6/1 (2,3) = 8/1 (2,4) = 6/2 | 2 to 3 |
| 3  | (3,1) = 6/2 (3,2) = 8/1 (3,4) = 6/1 | 3 to 2 |
| 4  | (4,1) = 6/3 (4,2) = 8/2 (4,3) = 8/1 | 4 to 3 |
| 9  | (9,10) = 4/1 (9,13) = 6/4 (9,14) = 6/5 (9,15) = 5/6 | 9 to 10 |
| 10 | (10,9) = 3/1 (10,13) = 6/3 (10,14) = 6/4 (10,15) = 5/5 | 10 to 9 |
| 13 | (13,9) = 3/4 (13,10) = 4/3 (13,14) = 6/1 (13,15) = 5/2 | 13 to 14 |
| 14 | (14,10) = 4/4 (14,13) = 6/1 (14,15) = 5/1 | 14 to 13 |
| 15 | (15,10) = 4/5 (15,13) = 6/2 (15,14) = 6/1 | 15 to 14 |

Step 6: The tree-like structure of linkages has grouped the points into three individual objects. The groupings are (1,2,3,4), (9,10), and (13,14,15). Note that the clustering distinguished the fine structure by dividing the sets (9,10) from (13,14,15) even though these points were candidates for linkage by virtue of being closer together than the radius, R.

Figure 4:
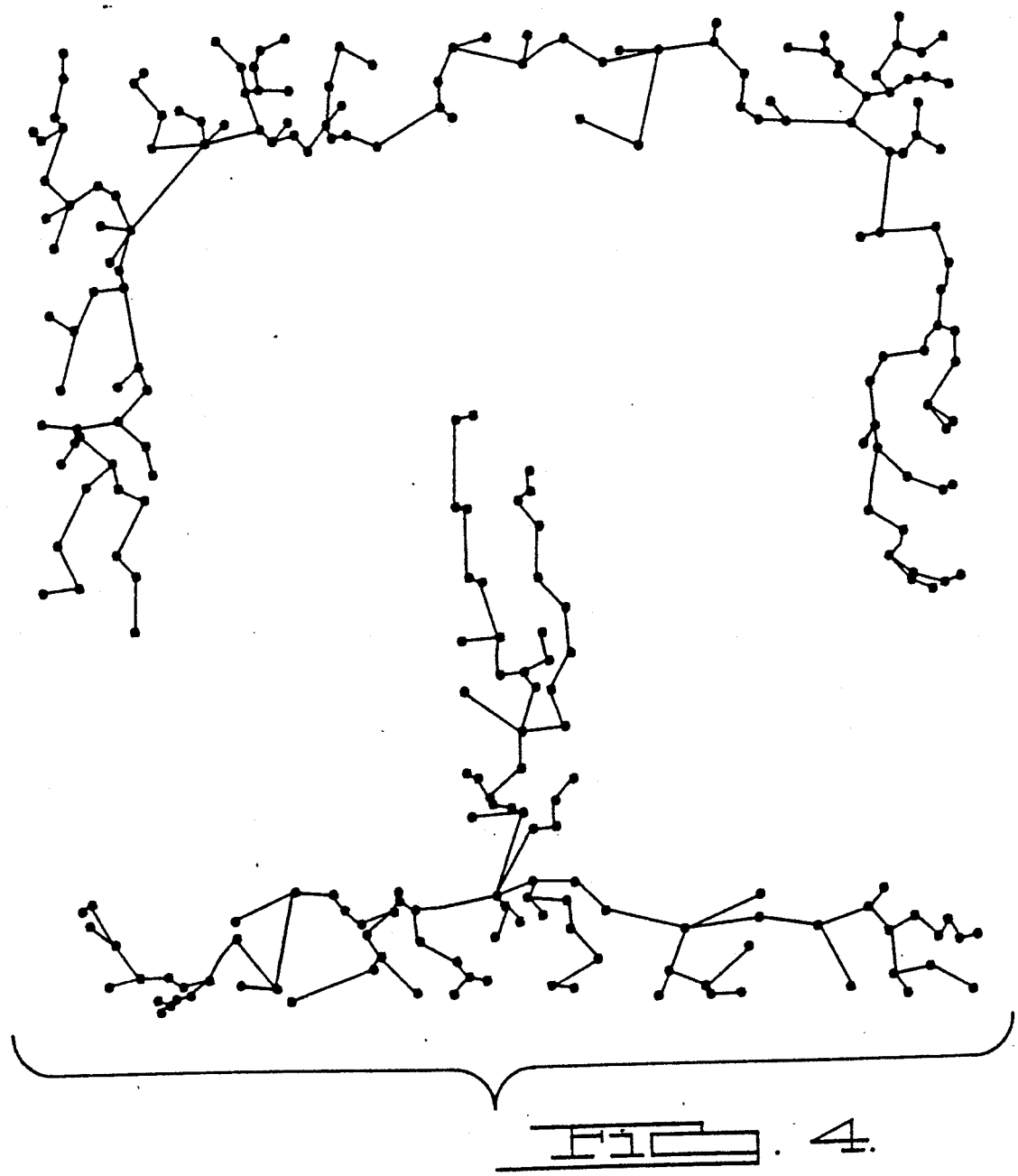
FIG. 4 is an example of clustering performed in accordance with the present invention.

The performance for nested objects is perhaps the most dramatic example of the ability of this new clusterer to determine both gross and fine structure of the field without any prior information concerning the distribution of objects within the field. FIG. 4 shows the result of clustering data into two objects, an inverted U and an inverted T, with the vertical bar of the T extending into the U.

It will be appreciated that the clustering technique, in accordance with the present invention, may be implemented in a number of ways. However, it will be appreciated that a broad range of computing machines may be employed to assist in the necessary calculations. For example, a computer, as shown in FIG. 5 may be employed to perform clustering in accordance with the present invention. In particular, a conventional computer 34 including a CPU 36 having registers 38, ALU 40, and a control unit 42, is connected to an input unit 44, an output unit 46, and memory unit 48 by means of system busses 50.

In accordance with the present invention, signals representative of the coordinates points in a data field are received by the input unit 44. The computer 34 is programmed to perform the six steps of the present invention. It will be appreciated that many different programming languages may be employed to achieve this result. Once the processing of the unit is complete, the computer 34 will transmit information to the output unit 46 representing the connected points. This output may comprise simply the coordinates of the points that are connected to each other, or, more sophisticated display methods may be used. For example, a plot showing the tree structure as shown in FIG. 4 may be displayed by the computer output unit 46.

It should also be recognized that the clustering technique can be used in one, two, or greater dimensional data fields and can be used to cluster data originating from a wide variety of sources. Also, the clustering technique makes no assumptions about the data to be clustered and can operate on data points in any order. While the above description constitutes the preferred embodiments of the present invention, it will be appreciated that the invention is susceptible to modifications, variation, and change without departing from the proper scope and fair meaning of the accompanying claims.

What is claimed is:

1. A method for forming clusters among a set of sensed data points within a field of said data points each having defined coordinate locations, said method comprising the steps of:

(a) storing said sensed data points in a programmable computer;

(b) generating signals defining the coordinate position of said sensed data points;

(c) determining a distance R for said data points, wherein R is a function of the distances between each pair of data points in the data field;

(d) calculating a parameter for each point within distance R of a chosen point, said parameter being proportional to the distance between the coordinate positions of the neighboring point and the chosen point;

(e) generating signals defining connections of the chosen points to a neighboring point that is selected on the basis of said calculated parameter; and (f) repeating steps (d) and (e), by designating additional data points as chosen points, wherein the additional data points are connected to neighboring points, and said generated signals defining connections, define clusters of groups of connected points;

(g) transmitting said generated signals to a display device; and (h) displaying said clusters.

2. The clustering method of claim 1 further comprising:

said step of determining a distance R further including calculating the average distance between each pair of data points in the data field, wherein R is a function of said average;

said step of calculating a parameter further including calculating a density value for each data point, said density value being proportional to the density of points lying within distance R of each data point, and calculating a ratio for each neighboring point within distance R from the chosen point, said ratio being directly proportional to said density for neighboring points, and inversely proportional to the distance of the neighboring points from the chosen point, wherein said parameter is a function of said ratio; and said step of generating signals defining connections further including determining the neighboring point having the largest said ratio.

3. The clustering method of claim 2 wherein said step of calculating a density value further comprises the steps of:

determining the distance from a given point of all the points within distance R of the given point;

calculating a weighted distance for all the points within R of the given point by multiplying said distance by a weighting function that decreases as the distance from said given point increases; and adding said weighted distances to determine said density.

4. The method of claim 2 wherein step (c) further comprises the step of calculating the standard deviation of said distances and R is a function of both the average distance and the standard deviation.

5. The method of claim 2 wherein step (e) further comprises the steps of multiplying the total number of possible data points in the field within distance R of the chosen point by a predetermined constant to arrive at a maximum density value, and limiting said calculated density value to values less than or equal to the maximum density value.

6. The method of claim 2 further comprising the step of:

when there is more than one data point having a ratio value equal to the largest ratio value for a chosen point, choosing the point for connecting with the chosen point by a random selection process.

7. The method of claim 1 wherein said sensed data points in said field represents points of data from measured physical quantities.

8. The method of claim 7 wherein said measured physical quantities represent locations of objects.

9. The method of claim 7 wherein said data points represent pixels in an image.

10. A method for clustering a set of data points each having defined coordinate locations in a data field that represents points of data from measured physical quantities, said method comprising:

(a) storing said sensed data points in a programmable computer;

(b) generating signals defining the coordinate position of said sensed data points;

(c) determining a distance R for the set of data points, wherein R is a function of the average distances between each pair of data points in the data field;

(d) calculating a density value for each data point by determining the distance from a given point of all the points within distance R of the given point and calculating weighted distance for all of the points within R of the given point by multiplying said distance by a weighting function that decreases as the distance from said given point increases and adding said weighted distances to determine said density;

(e) for a chosen point, calculating a ratio for each neighboring point within distance R from the chosen point, said ratio being directly proportional to said density for neighboring points, and inversely proportional to the distance of the neighboring point from the chosen point;

(f) generating signals defining connections of the chosen point to the neighboring point having the largest ratio value;

(g) repeating steps e and f for each data point, wherein each point is connected to its neighboring point having the largest ratio value, and said generated signals defining connections, define clusters of groups of connected points;

(h) transmitting said generated signals to a display device; and (i) displaying said clusters.

11. An apparatus for clustering a set of data points in a data field, said apparatus comprising:

input means for receiving signals representing said data points;

memory device for storing said signals;

processing means for generating signals defining the coordinate position of said data points;

processing means for determining a distance R for the set of data points, wherein R is a function of the distances between the coordinate positions of each pair of data points in the data field;

processing means for calculating a parameter for each neighboring point within distance R from a chosen point, said parameter being proportional to the distance between the coordinate positions of the neighboring point and the chosen point;

means for generating signals defining connections of the chosen point to a neighboring point that is selected on the basis of said calculated parameter, and wherein said generated signals define clusters of groups of connected points;

means for transmitting said generated signals to a display device; and means for displaying said clusters.

12. The apparatus of claim 11 further comprising:

said processing means for determining a distance R further including means for calculating the average distance between each pair of data points in the data field, wherein R is a function of said average;

said processing means for calculating a parameter further includes means for calculating a density value for each data point, said density value being proportional to the density of points lying within distance R of each data point, and means for calculating a ratio for each neighboring point within distance R from the chosen point, said ratio being directly proportional to said density for neighboring points, and inversely proportional to the distance of the neighboring points from the chosen ratio, wherein said parameter is a function of said ratio; and said means for connecting the chosen points to a neighboring point further including means for determining the neighboring point having the largest ratio.

13. The apparatus of claim 12 wherein said means for calculating a density value further includes steps of:

means for determining the distance from a given point of all the points within distance R of the given point;

means for calculating a weighted distance for all the points within R of the given point by multiplying said distance by a weighting function that decreases as the distance from said given point increases; and means for adding said weighted distances to determine said density.

14. The apparatus of claim 12 wherein the means for calculating a density value further comprises means for multiplying the total number of possible data points in the field within distance R of the chosen point by a predetermined constant to arrive at a maximum density value, and means for limiting said calculated density value to values less than or equal to the maximum density value.

15. The apparatus of claim 1 wherein said data points in said field represent points of data from measured physical quantities.

* * * * *